US012556441B1

United States Patent
Kling et al.

(10) Patent No.: US 12,556,441 B1
(45) Date of Patent: Feb. 17, 2026

(54) SYSTEM AND METHOD FOR COMPUTING INFRASTRUCTURE AND OPERATIONAL RESTORAL THROUGH AUTOMATED DEPENDENCY MAPPING

(71) Applicant: BANK OF AMERICA CORPORATION, Charlotte, NC (US)

(72) Inventors: John H. Kling, Alexandria, VA (US);
Charles Dudley, Concord, NC (US);
Jason Yeung, Forest Hills, NY (US);
Jordan Lasher, Dallas, NC (US);
Teshager Chanie Biable, Wylie, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 6 days.

(21) Appl. No.: 18/805,804

(22) Filed: Aug. 15, 2024

(51) Int. Cl.
*G06F 15/16* (2006.01)
*H04L 41/0654* (2022.01)
*H04L 41/0677* (2022.01)

(52) U.S. Cl.
CPC ...... *H04L 41/0654* (2013.01); *H04L 41/0677* (2013.01)

(58) Field of Classification Search
CPC .............. H04L 41/0654; H04L 41/0677
USPC ........................................................ 709/224
See application file for complete search history.

(56) References Cited

U.S. PATENT DOCUMENTS

| 7,469,287 B1 * | 12/2008 | Castillo ............... H04L 41/0663 709/224 |
| 8,019,857 B2 * | 9/2011 | Nguyen ................. G06Q 10/06 709/224 |
| 10,666,494 B2 * | 5/2020 | Zafer ................... H04L 41/0654 |
| 10,733,043 B2 * | 8/2020 | Cmielowski ........ G06F 11/0751 |
| 11,431,550 B2 * | 8/2022 | Zafer ................... H04L 41/0654 |
| 11,516,046 B2 * | 11/2022 | Wang ................. H04L 12/40013 |
| 11,516,070 B1 * | 11/2022 | Shemer ............... H04L 41/0631 |
| 11,716,241 B1 * | 8/2023 | Joseph ................ H04L 41/0654 709/224 |
| 11,797,877 B2 * | 10/2023 | Sharma ..................... G06N 3/08 |
| 12,205,021 B1 * | 1/2025 | Aravabhumi ............ G06N 3/08 |
| 12,237,965 B2 * | 2/2025 | Dixit J .................... G06V 30/18 |
| 2010/0063855 A1 * | 3/2010 | Nguyen ................. G06Q 10/06 709/224 |

(Continued)

*Primary Examiner* — Moustafa M Meky
(74) *Attorney, Agent, or Firm* — Moore & Van Allen PLLC; Nicholas C. Russell

(57) ABSTRACT

A system is provided for computing infrastructure and operational restoral through automated dependency mapping. In particular, the system may comprise a data repository that may contain aggregated data regarding the various operational and/or infrastructure-related services along with the underlying computing resources that support each service. The data repository may be automatically populated based on monitoring the various computing resources within a network environment. Using an artificial intelligence engine, the system may determine and designate a priority level for each of the services, as well as generate a mapping of dependencies of the services to the computing resources. The system may then automatically determine a sequence in which the underlying computing resources should be restored in order to restore functionality of services in the event of a malfunction. In this way, the system may provide an accurate and expeditious way to restore critical services within a computing environment.

20 Claims, 5 Drawing Sheets

(56) References Cited

U.S. PATENT DOCUMENTS

| | | | |
|---|---|---|---|
| 2019/0065990 A1* | 2/2019 | Sharma | G06N 3/09 |
| 2019/0149396 A1* | 5/2019 | Zafer | H04L 41/0654 |
| | | | 709/224 |
| 2019/0317849 A1* | 10/2019 | Cmielowski | G06F 11/0772 |
| 2020/0287779 A1* | 9/2020 | Zafer | H04L 41/0631 |
| 2021/0218596 A1* | 7/2021 | Wang | H04L 41/0654 |
| 2022/0417081 A1* | 12/2022 | Zafer | H04L 41/0654 |
| 2023/0054912 A1* | 2/2023 | Dixit J | G06V 30/19 |
| 2023/0370324 A1* | 11/2023 | Oglesby | H04L 41/0631 |
| 2024/0281318 A1* | 8/2024 | Sethi | G06F 11/0793 |
| 2025/0103980 A1* | 3/2025 | Deljavan Farshi | G06Q 40/02 |

\* cited by examiner

SYSTEM AND METHOD FOR COMPUTING INFRASTRUCTURE AND OPERATIONAL RESTORAL THROUGH AUTOMATED DEPENDENCY MAPPING

TECHNOLOGICAL FIELD

Example embodiments of the present disclosure relate to a system and method for computing infrastructure and operational restoral through automated dependency mapping.

BACKGROUND

There is a need for an intelligent and expedient way to detect and restore critical infrastructure and services within a computing environment.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for computing infrastructure and operational restoral through automated dependency mapping. In particular, the system may comprise a data repository that may contain aggregated data regarding the various operational and/or infrastructure-related services along with the underlying computing resources that support each service. The data repository may be automatically populated based on monitoring the various computing resources within a network environment. Using an artificial intelligence engine, the system may determine and designate a priority level for each of the services, as well as generate a mapping of dependencies of the services to the computing resources. The system may then automatically determine a sequence in which the underlying computing resources should be restored in order to restore functionality of services in the event of a malfunction. In this way, the system may provide an accurate and expeditious way to restore critical services within a computing environment.

Accordingly, embodiments of the present disclosure provide a system for computing infrastructure and operational restoral through automated dependency mapping, the system comprising: a processing device; a non-transitory storage device containing instructions when executed by the processing device, causes the processing device to perform the steps of: monitoring one or more computing devices within a network environment, wherein monitoring the one or more computing devices comprises identifying one or more services and one or more infrastructure components within the network environment; identifying one or more computing resources within the network environment that implement the one or more services and the one or more infrastructure components based on monitoring the one or more computing devices; generating a mapping of interconnections between the one or more services, the one or more infrastructure components, and the one or more computing resources; detecting a technical issue within at least one of the one or more services, the one or more infrastructure components, or the one or more computing resources; and dynamically generating an ordered remediation plan based on the mapping of interconnections.

In some embodiments, the ordered remediation plan comprises a set of ordered remediation steps, wherein the set of ordered remediation steps comprises remediating the technical issue and a second technical issue within at least another one of the one or more services, the one or more infrastructure components, or the one or more computing resources in a specified order determined based on a detected chain of dependencies within the mapping of interconnections.

In some embodiments, the ordered remediation steps comprise at least one of rebooting the one or more computing devices, freeing memory space on the one or more computing devices, restoring power to the one or more computing devices, or updating software on the one or more computing devices.

In some embodiments, generating the ordered remediation plan comprises automatically implementing the set of ordered remediation steps.

In some embodiments, the mapping of interconnections is implemented as a graph database, wherein the one or more services, the one or more infrastructure components, and the one or more computing resources are represented as a plurality of nodes in the graph database, wherein each of the plurality of nodes are connected to at least one other node of the plurality of nodes by a directional relationship.

In some embodiments, the one or more computing resources comprises at least one of a virtual machine or application.

In some embodiments, the one or more infrastructure components comprises a hardware networking device, the hardware networking device comprising at least one of a router, networking hub, or switch.

Embodiments of the present disclosure also provide a computer program product for computing infrastructure and operational restoral through automated dependency mapping, the computer program product comprising a non-transitory computer-readable medium comprising code causing an apparatus to perform the steps of: monitoring one or more computing devices within a network environment, wherein monitoring the one or more computing devices comprises identifying one or more services and one or more infrastructure components within the network environment; identifying one or more computing resources within the network environment that implement the one or more services and the one or more infrastructure components based on monitoring the one or more computing devices; generating a mapping of interconnections between the one or more services, the one or more infrastructure components, and the one or more computing resources; detecting a technical issue within at least one of the one or more services, the one or more infrastructure components, or the one or more computing resources; and dynamically generating an ordered remediation plan based on the mapping of interconnections.

In some embodiments, the ordered remediation plan comprises a set of ordered remediation steps, wherein the set of ordered remediation steps comprises remediating the technical issue and a second technical issue within at least another one of the one or more services, the one or more infrastructure components, or the one or more computing resources in a specified order determined based on a detected chain of dependencies within the mapping of interconnections.

In some embodiments, the ordered remediation steps comprise at least one of rebooting the one or more computing devices, freeing memory space on the one or more computing devices, restoring power to the one or more computing devices, or updating software on the one or more computing devices.

In some embodiments, generating the ordered remediation plan comprises automatically implementing the set of ordered remediation steps.

In some embodiments, the mapping of interconnections is implemented as a graph database, wherein the one or more services, the one or more infrastructure components, and the one or more computing resources are represented as a plurality of nodes in the graph database, wherein each of the plurality of nodes are connected to at least one other node of the plurality of nodes by a directional relationship.

In some embodiments, the one or more computing resources comprises at least one of a virtual machine or application.

Embodiments of the present disclosure also provide a computer-implemented method for computing infrastructure and operational restoral through automated dependency mapping, the computer-implemented method comprising: monitoring one or more computing devices within a network environment, wherein monitoring the one or more computing devices comprises identifying one or more services and one or more infrastructure components within the network environment; identifying one or more computing resources within the network environment that implement the one or more services and the one or more infrastructure components based on monitoring the one or more computing devices; generating a mapping of interconnections between the one or more services, the one or more infrastructure components, and the one or more computing resources; detecting a technical issue within at least one of the one or more services, the one or more infrastructure components, or the one or more computing resources; and dynamically generating an ordered remediation plan based on the mapping of interconnections.

In some embodiments, the ordered remediation plan comprises a set of ordered remediation steps, wherein the set of ordered remediation steps comprises remediating the technical issue and a second technical issue within at least another one of the one or more services, the one or more infrastructure components, or the one or more computing resources in a specified order determined based on a detected chain of dependencies within the mapping of interconnections.

In some embodiments, the ordered remediation steps comprise at least one of rebooting the one or more computing devices, freeing memory space on the one or more computing devices, restoring power to the one or more computing devices, or updating software on the one or more computing devices.

In some embodiments, generating the ordered remediation plan comprises automatically implementing the set of ordered remediation steps.

In some embodiments, the mapping of interconnections is implemented as a graph database, wherein the one or more services, the one or more infrastructure components, and the one or more computing resources are represented as a plurality of nodes in the graph database, wherein each of the plurality of nodes are connected to at least one other node of the plurality of nodes by a directional relationship.

In some embodiments, the one or more computing resources comprises at least one of a virtual machine or application.

In some embodiments, the one or more infrastructure components comprises a hardware networking device, the hardware networking device comprising at least one of a router, networking hub, or switch.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
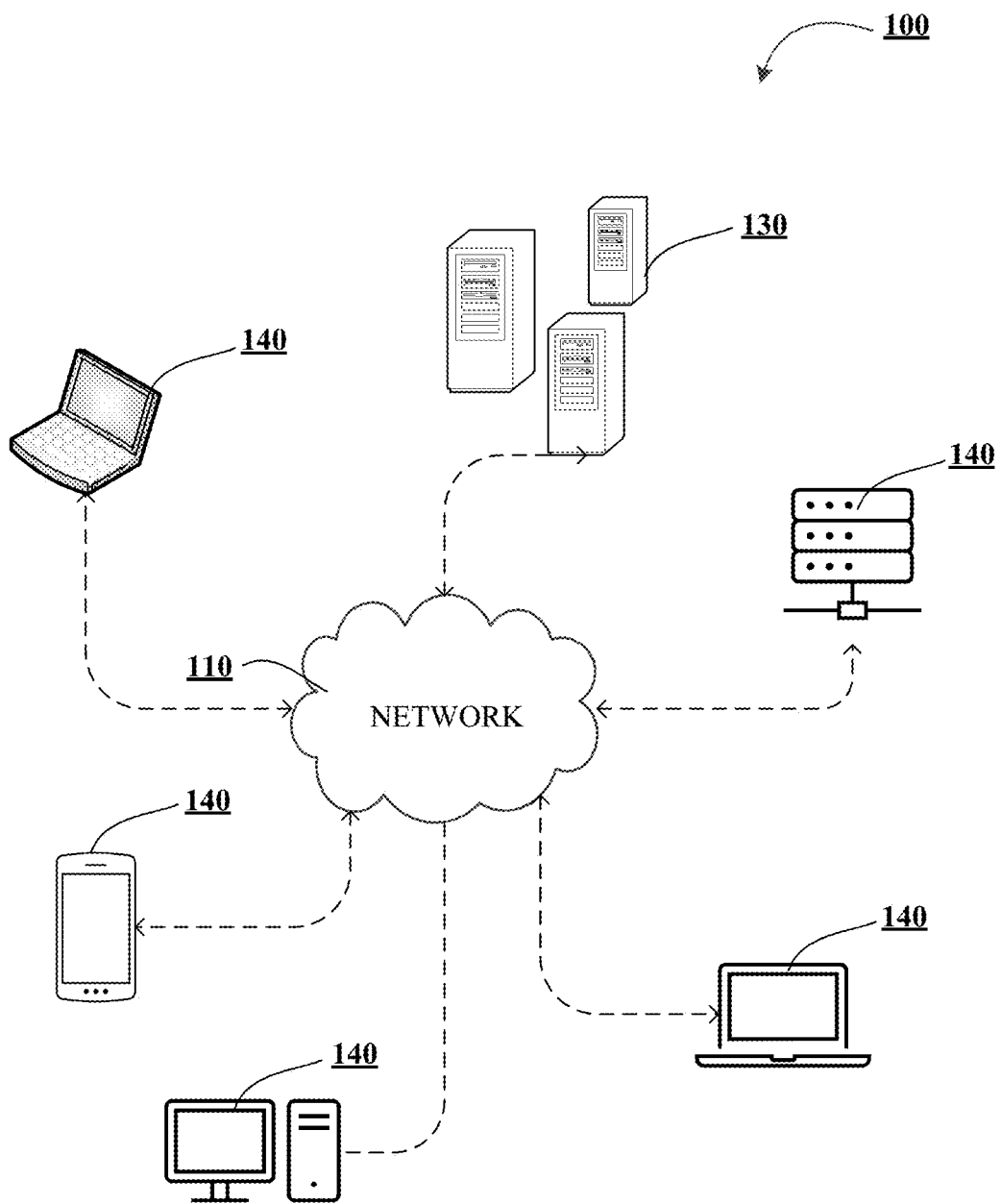
Figure 1B:
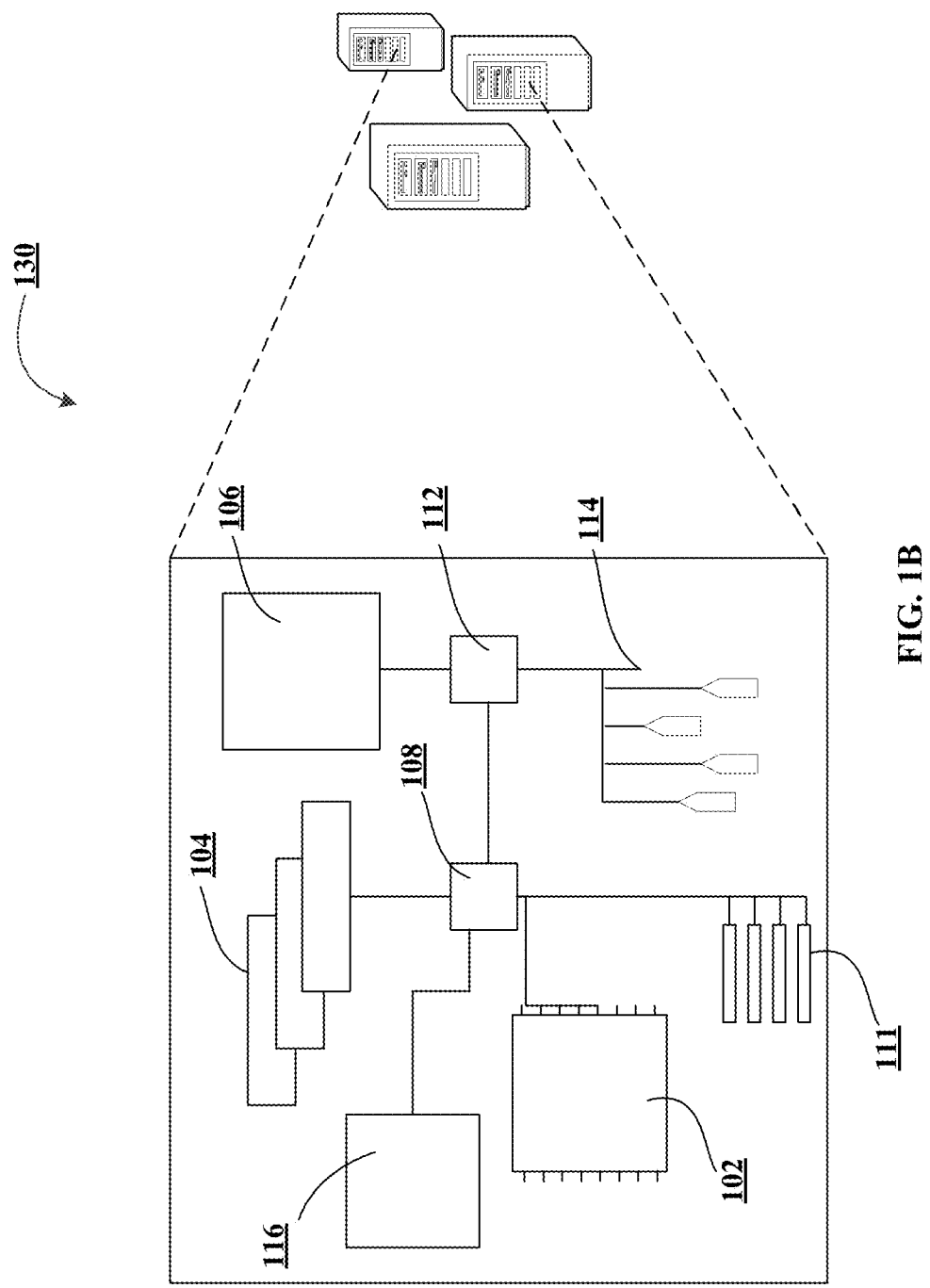
Figure 1C:
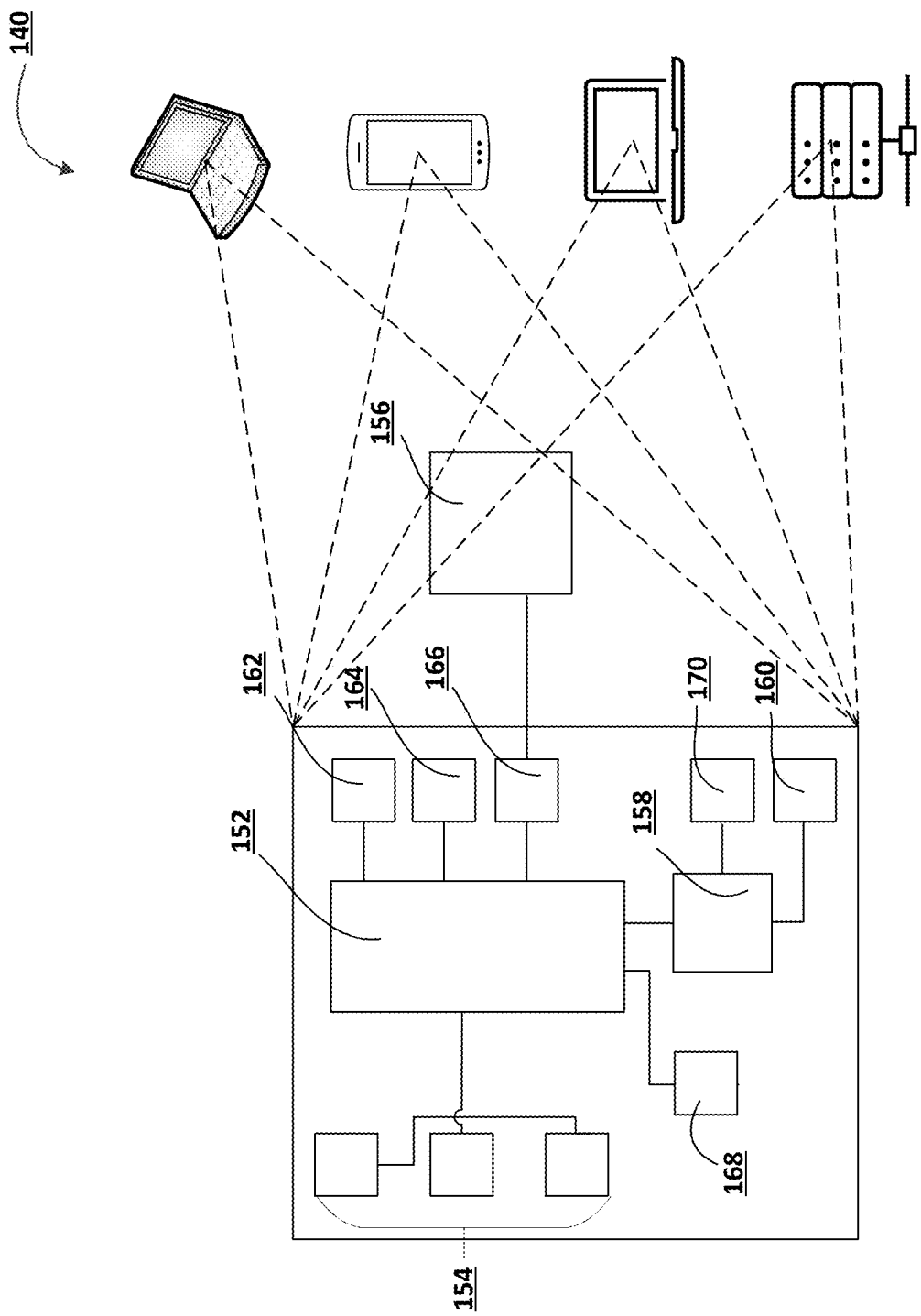
Figure 2:
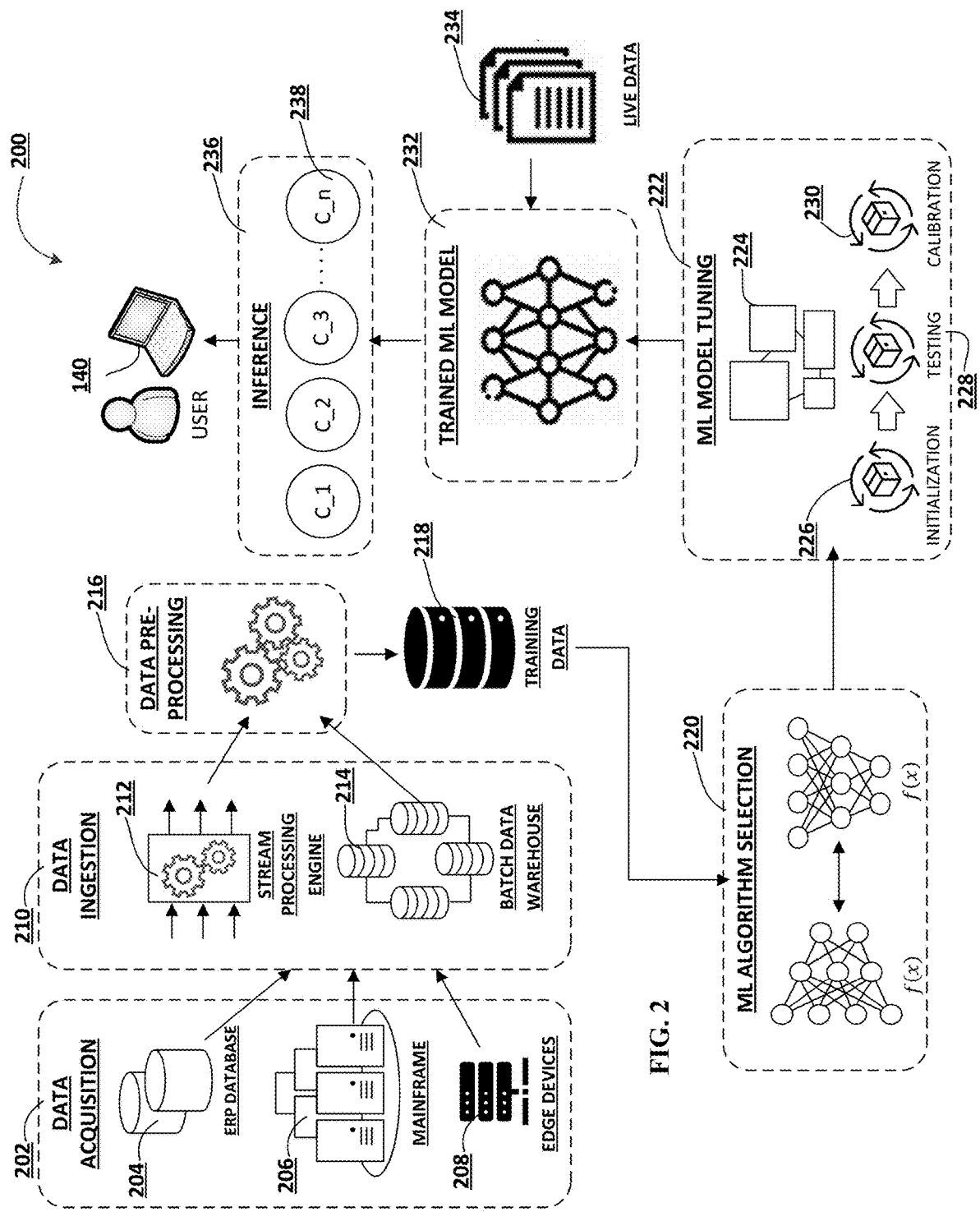
Figure 3:
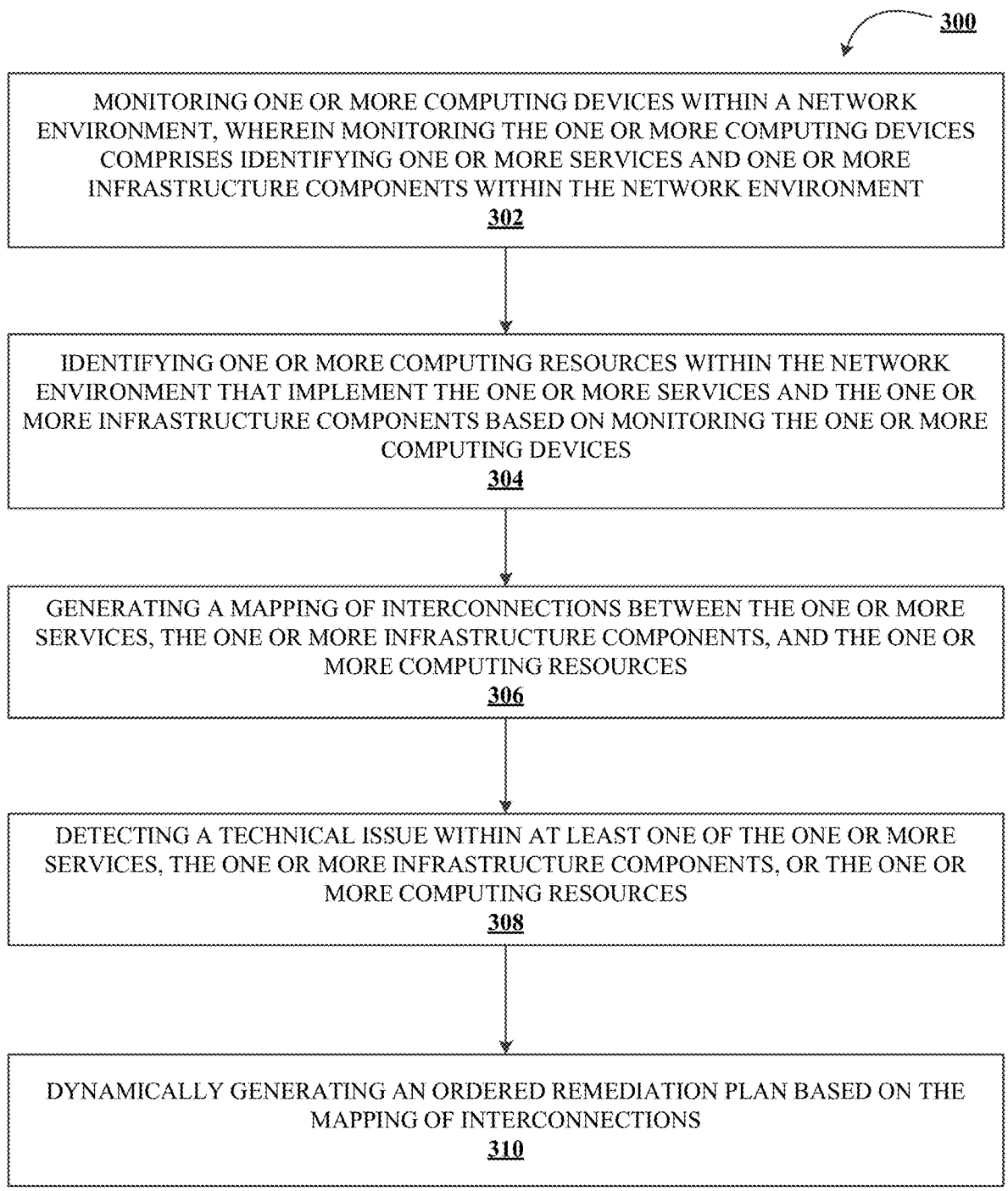

FIGS. 1A-1C illustrates technical components of an exemplary distributed computing system for computing infrastructure and operational restoral through automated dependency mapping, in accordance with an embodiment of the disclosure;

FIG. 2 illustrates an exemplary machine learning subsystem architecture, in accordance with an embodiment of the invention; and FIG. 3 illustrates a method for computing infrastructure and operational restoral through automated dependency mapping, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like.

Computing resources such as virtual machines or applications within an entity's network environment may implement various types of services and/or infrastructure components as part of a normal operating workflow. As such, the various services, infrastructure components, and computing resources (which may be referred to herein as "network components") within the network environment may form a complex, interconnected relationship in which certain services, infrastructures, and/or computing resources may depend from one another. With that said, technical issues may arise with respect to one or more network components that may cause a compounding effect on downstream components that may be dependent on the affected network components, which poses technical challenges in creating accurate and up-to-date dependency mappings. In turn, remediation of the technical issue may be delayed, causing potentially critical services to remain inoperable until a solution can be implemented. Accordingly, there is a need for an expedient, intelligent way to generate relationship mappings of the network components as well as a remediation plan for addressing the technical issue.

To address the above concerns among others, the system may track network components (e.g., services, network infrastructure components, and/or computing resources) to identify the relationships between such components. The computing resources within the network environment may be continuously monitored by the system. In this regard, the system may continuously intake information from each of the computing devices that host the computing resources, where such information may include system logs, error logs, running processes, and/or the like. Based on monitoring the devices, the system may extract information related to the operation and performance of the computing resources hosted on each of the computing devices within the network.

The system may determine a priority level of each of the various services and infrastructure components. Based on the priority levels, the system may identify a particular service or infrastructure component as "critical" or "non-critical." In this regard, a critical service may be a service that operates in the network environment that is considered to have a high priority level in terms of the operations of the entity and/or the network environment. For instance, a service that provides active protection and/or monitoring against malware or data breaches may be determined to have a high priority level that exceeds a critical threshold, and thus be designated by the system to be a "critical" service.

The system may then, using an artificial intelligence ("AI") engine, identify the computing resources (e.g., virtual machines, software applications, running processes, and/or the like) that implement the services identified by the system. To this end, the AI engine may intake the logs from the various computing devices in the network environment and parse and interpret the logs to identify which computing resources implement which services. Accordingly, in some embodiments, the AI engine may comprise use one or more natural language processing ("NLP") algorithms to analyze the logs. Once the relationships between the service and the underlying computing resources have been identified, the information related to the services and the associated computing resources may be stored in a network component data repository. In this regard, the repository may comprise one or more database tables that may store the information regarding all of the computing resources within the network environment as well as the services that are connected to the computing resources. The database tables may be automatically populated (e.g., through an extract, transform, load or "ETL" process) based on extracting the relevant data from the computing devices within the network environment.

The system may further identify the various infrastructure components that may be associated with the services and/or computing resources (e.g., using the AI engine). For instance, the infrastructure components may include hardware elements within the network environment, such as routers, hubs, switches, servers, computing devices, and/or the like. Upon identifying the infrastructure components, the system may identify the links or relationships between the computing resources and the infrastructure components that the computing resources implement. For instance, in order to implement the services described above, a computing resource may use certain infrastructure components (e.g., routers and other networking devices) to perform the processes necessary to implement such services. The links or relationships to the infrastructure components may then be stored within the database tables associated with the computing resources. In some embodiments, the system may automatically determine the priority level of the various infrastructure components (e.g., an infrastructure priority level) based on the dependency of high priority or critical services on the infrastructure components. In this regard, if the infrastructure priority level is determined to be above a critical threshold, the infrastructure component may be labeled as critical by the system.

Once the links between the services, infrastructure components, and computing resources have been identified by the system, the system may automatically generate a mapping of the connections and interdependencies between the services, infrastructure components, and computing resources. For instance, the mapping may take the form of a graph database in which the services, infrastructure components, and computing resources are represented as nodes or edges that may be connected by directional relationships that show the nature of the dependencies that exist within the relationships. Based on the mapping of connections, the system may then automatically and dynamically determine the sequence and paths of restoral based on the understanding of the dependencies of the various network components in the event that a technical issue is detected within a particular network component. In some embodiments, the system may further determine one or more parallel restoral paths to expedite the restoral of critical services and/or infrastructure components.

An exemplary embodiment is provided as follows for illustrative purposes only. In one embodiment, a computing resource such as a virtual machine may implement a service for sharing encrypted data. The service in turn may be dependent on various infrastructure components (e.g., a server for storing the data, networking devices and peripherals for maintaining the connection to the server, other services or computing resources such as user-facing applications for receiving requests for the data, and/or the like). The system may identify and store the connections between the various network components and generate a mapping that represents the interconnectedness and dependencies of the components. Subsequently, the system may detect a technical issue in one of the services, infrastructure components, or computing resources. For instance, the technical issue may be a performance issue (e.g., memory overload causing delayed processing of data requests) within the server. In turn, the technical issue may cause another (e.g., second) technical issue (e.g., malfunction of a user-facing application that depends on the server). Based on detecting the technical issue, the system may dynamically generate a sequence of steps (e.g., a remediation plan) for remediating the technical issue. For instance, in order to restore the data sharing service, the system may traverse the dependency tree to determine which network components must be remediated and in what order. In this regard, certain network components must be remediated first in order to then remediate those components that may be dependent on the first network component (e.g., the server must be restored before the application is addressed). The system may further generate an AI-based time estimation for completion of the remediation plan. The system may then execute the remediation plan to remedy the technical issue (e.g., by clearing memory space within the server) by taking the proper steps to ensure that the issues are resolved in the correct order to fully restore functionality of the affected service.

In some embodiments, the system may comprise a reporting engine that is configured to generate a visualization of the mappings and/or remediation plans that have been generated based on the information within the repository. In this regard, the system may further comprise an online portal that may be accessed by various users within and/or outside of the entity's network. The online portal may be a network-accessible interface (e.g., a web-based interface) that may present a graphical user interface to a user once the user has logged onto the online portal. The visualizations may take the form of a graph database that may contain the network components that are relevant to a particular critical service, where each component is connected to another component by a directional relationship indicator (e.g., an arrow). In the case that the visualization is of a remediation plan, the system may further be configured to present the ordered steps for remediating a particular issue. In some embodiments, the AI engine may intelligently select the elements to be displayed within the visualization. For example, if the visualization represents the relationships for certain components that must be restored to remediate an issue within a critical service, the AI engine may selectively display the relationships (e.g., arrows) that are most relevant for restoring the service. In this way, the system may generate visualizations that may be presented in a more user-friendly format.

The system as disclosed herein provides numerous technical advantages over conventional systems for detecting and remediating issues within a network environment. For instance, by using an AI engine to automatically generate the mappings between network components and their dependencies, the system may eliminate the error-prone and time-intensive nature of user-driven identification of interdependencies and generation of remediation plans, thereby effectively reducing the downtime of critical services and/or infrastructure components. Furthermore, by intelligently generating custom and dynamic visualizations of the remediation plan, the system may ensure that the relevant information for remediating technical issues is presented in the most suitable format.

Turning now to the figures, FIGS. 1A-1C illustrate technical components of an exemplary distributed computing environment 100 for the system for computing infrastructure and operational restoral through automated dependency mapping. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110.

Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for computing infrastructure and operational restoral through automated dependency mapping. As shown in block 302, the method includes monitoring one or more computing devices within a network environment, wherein monitoring the one or more computing devices comprises identifying one or more services and one or more infrastructure components within the network environment. The one or more services may include various types of operational processes that may be executed within an entity's network environment. The one or more infrastructure components may comprise hardware networking devices such as routers, switches, hubs, and/or the like. The system may identify the services and/or infrastructure components by, for instance, parsing and analyzing log files stored within the computing devices, where the log files may contain event data, error logs, performance data, and/or the like. In some embodiments, identifying the one or more services and/or infrastructure components may further comprise computing a priority level of the one or more services and/or infrastructure components, detecting that the priority level exceeds a critical threshold, and thereafter designating the one or more services and/or the infrastructure components as critical.

Next, as shown in block 304, the method includes identifying one or more computing resources within the network environment that implement the one or more services and the one or more infrastructure components based on monitoring the one or more computing devices. The computing resources may be, for instance, virtual machines, applications, system processes, and/or the like. Accordingly, the computing resources may depend on the one or more services and/or the one or more infrastructure components to execute workflows.

Next, as shown in block 306, the method includes generating a mapping of interconnections between the one or more services, the one or more infrastructure components, and the one or more computing resources. The mapping of interconnections may be, for instance, a graph database that represents the one or more services, the one or more infrastructure components, and/or the one or more computing resources as nodes, where each of the nodes is connected to at least one other node by a directional relationship signifying a dependency of one node on the other node.

Next, as shown in block 308, the method includes detecting a technical issue within at least one of the one or more services, the one or more infrastructure components, or the one or more computing resources. The technical issue may include various types of issues, such as performance issues, availability issues, hardware failures, and/or the like. The presence of the issue in one of the network components may in turn affect the operation of the various downstream elements that may rely on the affected network component. As such, a first technical issue within one component may cause additional (e.g., a second, third, and/or the like) technical issues in other, downstream components. Accordingly, in order to resolve all of the technical issues, the issues must often be resolved in the correct order, as described herein.

Next, as shown in block 310, the method includes dynamically generating an ordered remediation plan based on the mapping of interconnections. The ordered remediation plan may comprise a set of ordered steps, where the steps may include one or more remediation processes such as rebooting devices, updating software, restoring power, freeing memory space, allocating additional resources, and/or the like. The set of ordered steps may further include resolving the technical issue and a second technical issue (which may be in the same or different service, infrastructure component, and/or computing resource) in a specific order (e.g., resolve the technical issue first, then the second technical issue, and the like) according to a determined chain of dependencies within the mapping of interconnections. In some embodiments, the system may automatically implement the remediation plan by executing the ordered steps in the designated order. In this way, the system may provide an intelligent way to detect and remediate technical issues within the network environment.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for computing infrastructure and operational restoral through automated dependency mapping, the system comprising:
    a processing device;
    a non-transitory storage device containing instructions when executed by the processing device, causes the processing device to perform the steps of:
        monitoring one or more computing devices within a network environment, wherein monitoring the one or more computing devices comprises identifying one or more services and one or more infrastructure components within the network environment;
        identifying one or more computing resources within the network environment that implement the one or more services and the one or more infrastructure components based on monitoring the one or more computing devices;
        generating a mapping of interconnections between the one or more services, the one or more infrastructure components, and the one or more computing resources;

detecting a technical issue within at least one of the one or more services, the one or more infrastructure components, or the one or more computing resources; and dynamically generating an ordered remediation plan based on the mapping of interconnections.

2. The system of claim 1, wherein the ordered remediation plan comprises a set of ordered remediation steps, wherein the set of ordered remediation steps comprises remediating the technical issue and a second technical issue within at least another one of the one or more services, the one or more infrastructure components, or the one or more computing resources in a specified order determined based on a detected chain of dependencies within the mapping of interconnections.

3. The system of claim 2, wherein the ordered remediation steps comprise at least one of rebooting the one or more computing devices, freeing memory space on the one or more computing devices, restoring power to the one or more computing devices, or updating software on the one or more computing devices.

4. The system of claim 2, wherein generating the ordered remediation plan comprises automatically implementing the set of ordered remediation steps.

5. The system of claim 1, wherein the mapping of interconnections is implemented as a graph database, wherein the one or more services, the one or more infrastructure components, and the one or more computing resources are represented as a plurality of nodes in the graph database, wherein each of the plurality of nodes are connected to at least one other node of the plurality of nodes by a directional relationship.

6. The system of claim 1, wherein the one or more computing resources comprises at least one of a virtual machine or application.

7. The system of claim 1, wherein the one or more infrastructure components comprises a hardware networking device, the hardware networking device comprising at least one of a router, networking hub, or switch.

8. A computer program product for computing infrastructure and operational restoral through automated dependency mapping, the computer program product comprising a non-transitory computer-readable medium comprising code causing an apparatus to perform the steps of:

monitoring one or more computing devices within a network environment, wherein monitoring the one or more computing devices comprises identifying one or more services and one or more infrastructure components within the network environment;

identifying one or more computing resources within the network environment that implement the one or more services and the one or more infrastructure components based on monitoring the one or more computing devices;

generating a mapping of interconnections between the one or more services, the one or more infrastructure components, and the one or more computing resources;

detecting a technical issue within at least one of the one or more services, the one or more infrastructure components, or the one or more computing resources; and dynamically generating an ordered remediation plan based on the mapping of interconnections.

9. The computer program product of claim 8, wherein the ordered remediation plan comprises a set of ordered remediation steps, wherein the set of ordered remediation steps comprises remediating the technical issue and a second technical issue within at least another one of the one or more services, the one or more infrastructure components, or the one or more computing resources in a specified order determined based on a detected chain of dependencies within the mapping of interconnections.

10. The computer program product of claim 9, wherein the ordered remediation steps comprise at least one of rebooting the one or more computing devices, freeing memory space on the one or more computing devices, restoring power to the one or more computing devices, or updating software on the one or more computing devices.

11. The computer program product of claim 9, wherein generating the ordered remediation plan comprises automatically implementing the set of ordered remediation steps.

12. The computer program product of claim 8, wherein the mapping of interconnections is implemented as a graph database, wherein the one or more services, the one or more infrastructure components, and the one or more computing resources are represented as a plurality of nodes in the graph database, wherein each of the plurality of nodes are connected to at least one other node of the plurality of nodes by a directional relationship.

13. The computer program product of claim 8, wherein the one or more computing resources comprises at least one of a virtual machine or application.

14. A computer-implemented method for computing infrastructure and operational restoral through automated dependency mapping, the computer-implemented method comprising:

monitoring one or more computing devices within a network environment, wherein monitoring the one or more computing devices comprises identifying one or more services and one or more infrastructure components within the network environment;

identifying one or more computing resources within the network environment that implement the one or more services and the one or more infrastructure components based on monitoring the one or more computing devices;

generating a mapping of interconnections between the one or more services, the one or more infrastructure components, and the one or more computing resources;

detecting a technical issue within at least one of the one or more services, the one or more infrastructure components, or the one or more computing resources; and dynamically generating an ordered remediation plan based on the mapping of interconnections.

15. The computer-implemented method of claim 14, wherein the ordered remediation plan comprises a set of ordered remediation steps, wherein the set of ordered remediation steps comprises remediating the technical issue and a second technical issue within at least another one of the one or more services, the one or more infrastructure components, or the one or more computing resources in a specified order determined based on a detected chain of dependencies within the mapping of interconnections.

16. The computer-implemented method of claim 15, wherein the ordered remediation steps comprise at least one of rebooting the one or more computing devices, freeing memory space on the one or more computing devices, restoring power to the one or more computing devices, or updating software on the one or more computing devices.

17. The computer-implemented method of claim 15, wherein generating the ordered remediation plan comprises automatically implementing the set of ordered remediation steps.

18. The computer-implemented method of claim 14, wherein the mapping of interconnections is implemented as a graph database, wherein the one or more services, the one or more infrastructure components, and the one or more computing resources are represented as a plurality of nodes in the graph database, wherein each of the plurality of nodes are connected to at least one other node of the plurality of nodes by a directional relationship.

19. The computer-implemented method of claim 14, wherein the one or more computing resources comprises at least one of a virtual machine or application.

20. The computer-implemented method of claim 14, wherein the one or more infrastructure components comprises a hardware networking device, the hardware networking device comprising at least one of a router, networking hub, or switch.

* * * * *